C. H. CASPAR.
AIRCRAFT.
APPLICATION FILED MAY 8, 1919.

1,376,675.

Patented May 3, 1921.
3 SHEETS—SHEET 1.

WITNESSES

INVENTOR
CHARLES H. CASPAR
BY
ATTORNEYS

C. H. CASPAR.
AIRCRAFT.
APPLICATION FILED MAY 8, 1919.

1,376,675.

Patented May 3, 1921.
3 SHEETS—SHEET 2.

WITNESSES
Eugene A Wilson
A. L. Kitchin.

INVENTOR
CHARLES H. CASPER
BY
ATTORNEYS

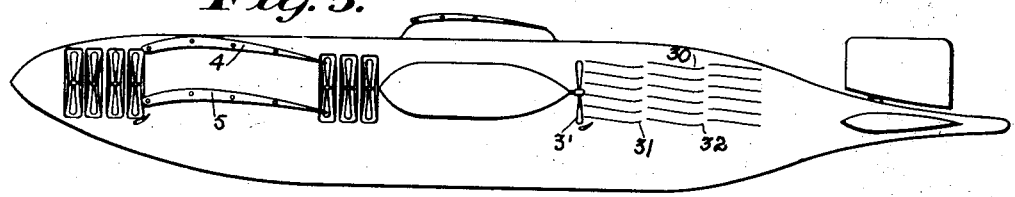
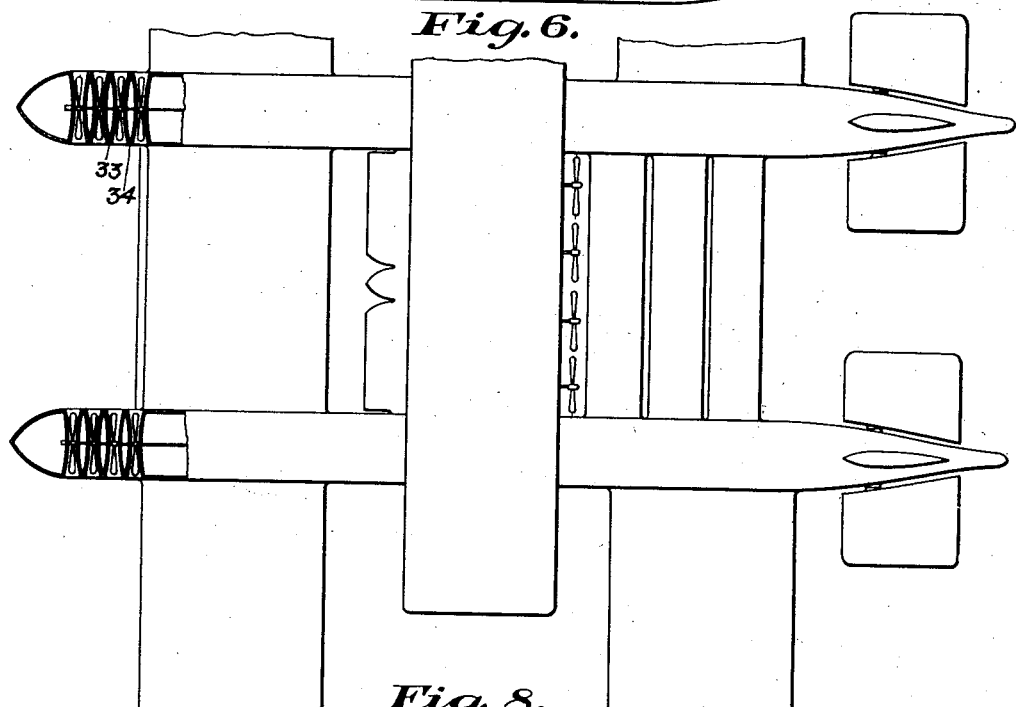
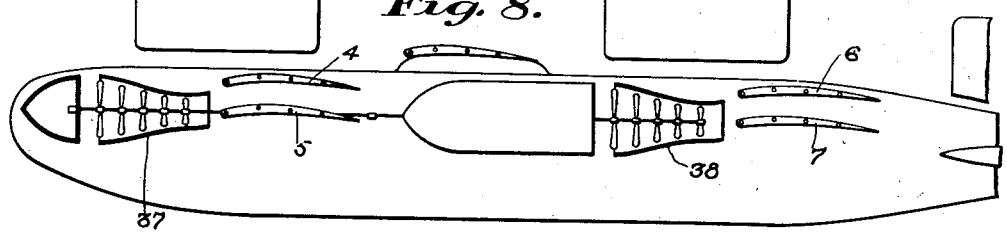
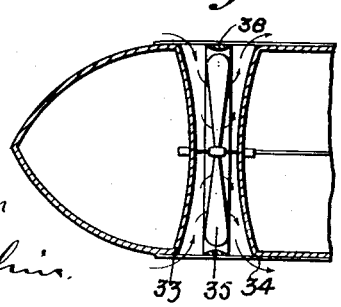

UNITED STATES PATENT OFFICE.

CHARLES H. CASPAR, OF PHILADELPHIA, PENNSYLVANIA.

AIRCRAFT.

1,376,675.           Specification of Letters Patent.      Patented May 3, 1921.

Application filed May 8, 1919. Serial No. 295,578.

*To all whom it may concern:*

Be it known that I, CHARLES H. CASPAR, a citizen of the United States, and a resident of Philadelphia, in the county of Philadelphia and State of Pennsylvania, have invented a new and Improved Aircraft, of which the following is a full, clear, and exact description.

This invention relates to aircraft and particularly to what are commonly known as "heavier than air machines." The object of the invention is to provide an airship in which the power is applied in a novel manner whereby part thereof will act to stabilize the ship, while the remaining part will act to lift and propel the ship.

Another object of the invention is to provide an airship in which the power applied thereto may be caused to act to lift the ship vertically and then move the ship forward.

A still further object of the invention is to provide an airship in which the power means may be regulated as to speed and thrust action at any time.

Another object is to provide a heavier than air ship in which a plurality of independent propelling means are provided and associated parts, the arrangement being such that the propelling means may operate at the same speed or at different speeds within the control of the operator.

In the accompanying drawings:

Fig. 5 is a side view of an airship embodying the invention, but disclosing a slightly modified form to that shown in Fig. 1.

Fig. 6 is a top plan view with certain parts broken away, of the airplane shown in Fig. 5.

Fig. 7 is an enlarged fragmentary sectional view showing an arrangement of closed thrust propeller embodying certain features of the invention.

Fig. 8 is a longitudinal vertical section similar to Fig. 1, but disclosing a further modified form to that illustrated in Figs. 1 and 5.

Figure 1:
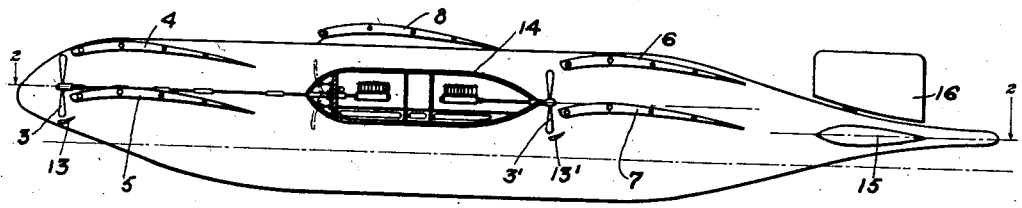
Figure 1 is a sectional view through Fig. 2 on line 1—1, disclosing one embodiment of the invention.

In constructing a heavier than air machine means must be provided for applying power so as to not only raise the machine from the ground or other support, but to propel the machine through the air as well as sustain a suitable load. Heretofore the power has been transmitted to a propeller arranged either at the front or rear of the machine, as for instance the ordinary airplane. This theory involves that the thrust be equal to the resistance of the airplane at a predetermined speed at which the wings or planes will support the required weight, the essential is the required thrust, the paradox is the greater the speed the less the thrust per unit of power. In the present invention the theories used in the plane above briefly described are not followed. The use of air pressure against what may be termed lifting or power planes is utilized to the full extent so that when the parts are adjusted in one position the pressure will cause an upward movement of the airship. The parts are also constructed so as to be adjusted gradually while the airplane is either in the air or on the ground, to gradually turn the power from holding or forcing the airship upwardly to forcing the airship forwardly. As the airship increases in speed in a substantially horizontal direction the upward lifting pressure is gradually diverted to adding to the forward thrust of the airship until there is only sufficient lifting tendency to sustain the airship while the airship is maintaining a maximum speed, at which time the propellers 3 and 3' may be stopped and only propellers 35 used as the airship now only requires sufficient thrust to maintain the desired forward speed. A number of different means may be provided for carrying out the inventive idea, but in order to give a more exact understanding a preferred form and two modified forms have been disclosed in the drawings to which reference is made.

In Figs. 1, 2, 3 and 4 a preferred form is illustrated in which the fuselages or bodies 1 and 2 are provided. It will, of course, be evident that a single centrally positioned fuselage, or three or more, could be substituted for the two shown in Fig. 3 without departing from the spirit of the invention.

When a single centrally positioned fuselage is used, however, a pair of side walls are arranged substantially at the points occupied by the fuselages 1 and 2 in order to confine the streams of air created by the various propellers 3, or steams of air due to movement of airship so that the air will act against the power planes hereinafter fully described. The fuselages or bodies 1 and 2 may be of any size and shape desired, preferably arranged with the lower part forming a pontoon or boat to support the airship on the water whenever desired. It will, of course, be evident that suitable landing gear may be provided for landing on the ground, though ordinarily the pontoons themselves will be sufficient landing gear, as the airship usually moves vertically upward in starting, and by means of a brake may be brought to a standstill for landing. Connected in any suitable manner with the fuselages 1 and 2 are planes 4, 5, 6 and 7 formed with any desired shape and extending from one fuselage to the other. A lifting plane 8 is arranged between any two batteries of the aforesaid planes, said central lifting plane extending a short distance beyond the fuselage, while stabilizing planes 9, 10, 11 and 12 extend outwardly from the fuselages 1 and 2 in line with the planes 4 to 7 inclusive or at any desired point. When passing substantially horizontally through the air the planes 9 to 12 will, of course, act in the usual manner of lifting planes while also acting as stabilizing means.

It will be noted that the various propellers 3 are arranged whereby as they rotate streams of air will be forced against both planes 4 and 5 and will produce a lifting action as well as a forward thrust. In order that the air may more accurately strike the lower plane 5 a deflector 13 is arranged below the propellers 3 for deflecting the air. As the air leaves the planes 4 and 5 its force acts on plane 8 and also on the cabin 14 which acts as a lifting plane. This cabin contains the engines or power and controlling devices for controlling the elevators 15 and the rudder 16 as well as means for controlling the operation of the engines. In addition, at the front of the cabin 14 are arranged a pair of brakes 17 and 18 which are shown more in detail in Fig. 4. Brakes may be located at any other point desired. From this figure it will be seen that ordinarily the brakes have a stream-line shape, but sections are supported by links 19 and 20 so that when the shaft 21, pivotally connected at 22 to the plates or brake-shoes 23 and 24, is moved rearwardly by the pinion 25 acting on the rack 26 the parts will move so that the shoes 23 and 24 will head substantially flatwise against the air and produce a retarding effect. In this way the speed of the airplane may be retarded without changing the speed of the propellers. The pinions 25 are connected to a suitable shaft 27 which extends into a controlling cabin 28 where a control wheel 29 is provided and when operated will open or close the brake shoes 23 and 24.

The propellers 3 at the front of the airship act principally on the planes 4 and 5, though some of the air is used against the lifting plane 8, while the rear planes 6 and 7 receive air blasts from a number of propellers 3' arranged at the rear of cabin 14 and in front of the planes 6 and 7 in a similar manner to the way the propellers 3 are arranged. A deflector 13' is provided so that the action against the planes will be merely a repetition of the action against the planes 4 and 5.

In the drawing a single set of forward planes are shown and a single set of rear planes are shown, but it will be evident that more could be provided if so desired so as to present a greater lifting surface with or without additional propellers. As the propellers 3 and 3' operate there will, of course, be the usual forward thrust provided which forces the airplane along through the air while the air blast therefrom acts as an upcurrent for supporting the airship. The planes 9 to 12 inclusive act as stabilizing planes and also lifting planes in the same sense that the planes now in common use on airplanes act while the planes 4 to 7 act as lifting planes by means of the currents of air produced by the propellers 3 and 3'. From Fig. 2 it will be seen that the various propellers are individually driven and consequently it is evident that any one, or more propellers may be stopped at any time and allowed to remain idle whereby the speed of the airplane may be varied without in any way endangering the safety of the occupants or of the airship itself. Any suitable form of controlling means may be provided for shifting the rudder 16 and the elevators 15, preferably an arrangement of worm and worm wheel with suitable shafting is provided extending to the control cabin 28. By properly manipulating the rudders 16 and the brakes 17 and 18 the airship may, if desired, be turned around on an even keel and at substantially any speed.

Figure 2:
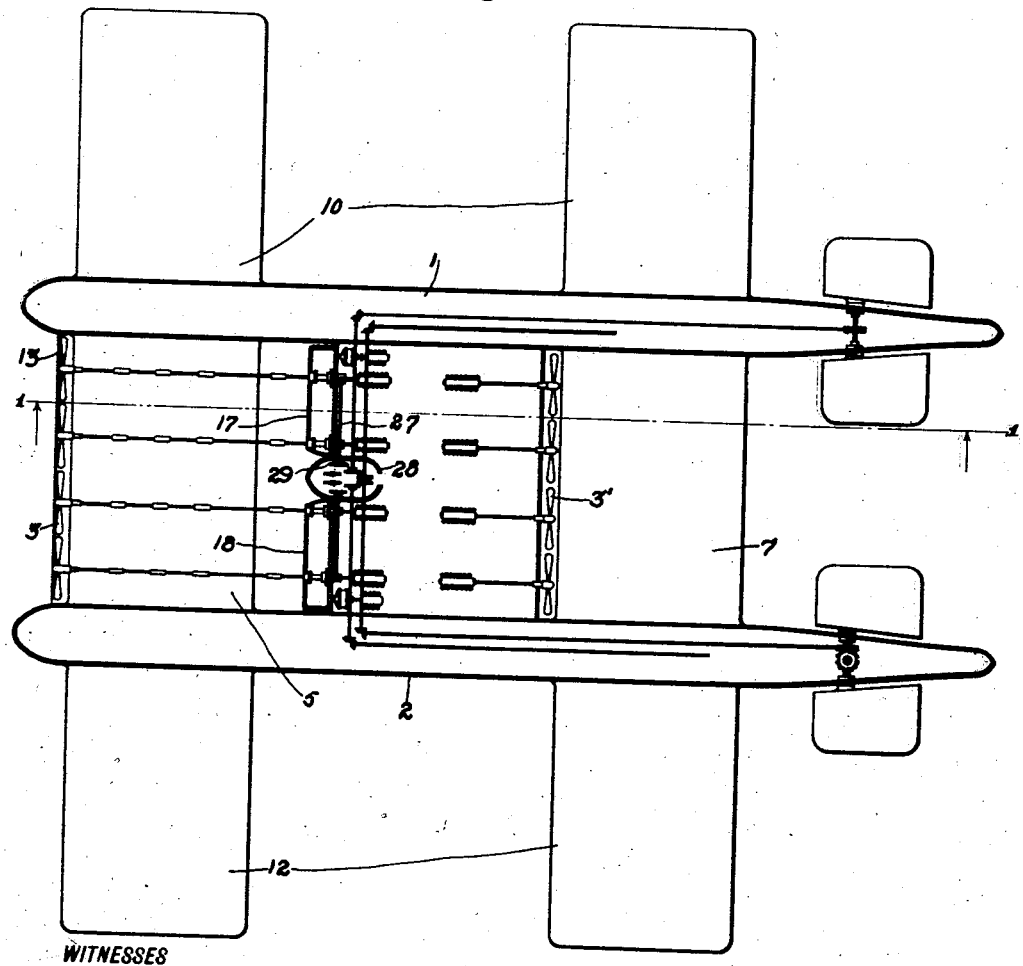
Fig. 2 is a horizontal sectional view through Fig. 1 on line 2—2.
Figure 3:
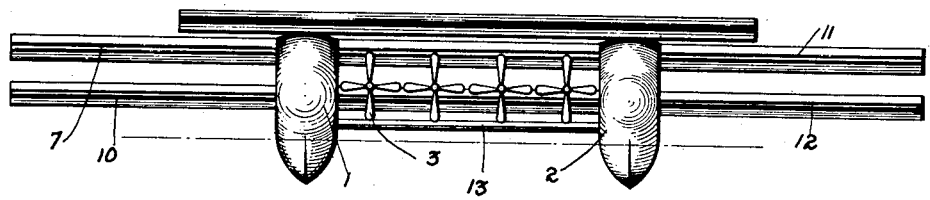
Fig. 3 is a front view of the airship shown in Fig. 2.
Figure 4:
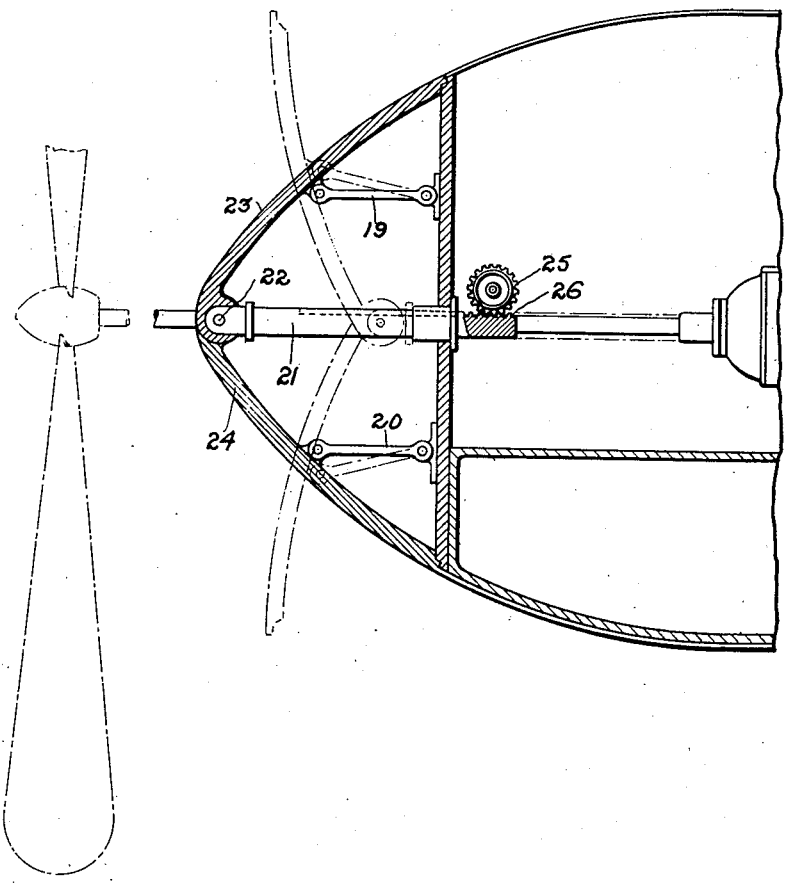
Fig. 4 is an enlarged fragmentary sectional view showing the arrangement of brakes used in the airship shown in Fig. 2.

In Figs. 5 and 6 a modified form of the invention is disclosed in which the same general idea is presented, but instead of having a single pair of planes similar to 6 and 7, a plurality of relatively closely positioned planes 30 may be used preferably arranged in superposed sets or series disposed one behind the other, all but the last series being formed with upwardly extending rear sections 31 and 32 so as to guide the air from the propellers 3' to the next succeeding series of planes, and so on until the air finally escapes at the rear. The propellers 3' are arranged as in the preferred form whereas the other propellers are differently positioned, namely are arranged in the rear of a wall or between walls 33 and 34 as illustrated in Fig. 7. It is to be noted that each of the propellers 35 is provided with a front wall 33 and a rear wall 34, though the latter is not essential, while there is an annular deflector 38 surrounding the propellers. This will result in the air passing in as indicated by the arrows and then out again. The action of the propellers 35 against the air produces the usual forward thrust, regardless of the speed of airship compared with pitch speed of propellers so that the airship is urged forward to that extent though the air comes in contact with the propellers in an entirely different way. By this construction and arrangement the propellers may be arranged at any part of the main fuselages, or may be arranged in separate fuselages. It is also evident that where there are a number of sets of propellers the different sets could be operated at different speeds and produce thrusts in proportion to the speed. When using the propellers in the open as shown in Figs. 1 and 2 they must all operate at substantially the same speed, as otherwise some would act as retarding members rather than propelling members. In the structure shown in Figs. 5 and 6, however, a large number of different speeds may be provided for the various propellers without any detrimental effect, as the thrust of each propeller, whether large or small, will merely be added to the forward impulse of the airship, and if sufficient, the open propellers may be stopped when the airship has attained the desired height and forward speed. Tests made demonstrated the fact that a propeller positioned as shown in Fig. 7 would produce its rated thrust regardless of the velocity of air outside of the walls 33—34, this phenomenon discovered by the inventor permits of utilizing propellers for maximum lift or thrust, i. e. propellers 35 may be driven at a velocity of thirty miles an hour and secure over twelve pounds thrust per horse power and propellers 3 at three hundred miles per hour, giving only one and one third pounds thrust per horse power, but three hundred miles velocity or maximum lift.

In Fig. 8 a further modified form of the invention is shown, in which the propellers are arranged in substantially funnel-shaped casings 37 and 38. The propellers arranged in this manner will give a thrust in proportion to their speed and in addition will give a high speed air current directed against the planes 4, 5, 6 and 7.

Many other forms could be illustrated showing the same inventive idea, which involves the utilization of power for thrust for a forward movement at maximum efficiency or moving the air at a less speed than the maximum forward speed of the airship and power for creating the air blast or air current for lifting means. It is, of course, evident that the power planes when the aircraft is passing rapidly through the air will act as lifting planes due to their speed or velocity, also as the airplane begins to move faster and faster almost all of the power will be used in the forward thrust or forward movement of the airship and comparatively little for direct sustentation in the same manner and substantially on the same theory of the supporting action of a large projectile, which, of course, is not provided with lifting planes.

In starting the airship, it being assumed that the same is stationary, the propellers are first started and all of the air current produced thereby is projected between the fuselages 1 and 2 and caused to act directly on the planes 4 to 7 inclusive. This action is assisted by the deflectors 13 and 13' which give an upward tendency to the air. In addition to this action of the air the propellers in revolving naturally give a forward thrust and tend to start the airship forwardly as well as upwardly, but to prevent any appreciable forward movement the brakes 17 and 18 are moved, for instance to the dotted position shown in Fig. 4 and the entire force is utilized for lifting the ship substantially vertically. After the airship has moved upwardly any desired distance a gradual reduction of the braking action by closing the shoes 23 and 24 will result in the airship gradually moving forward at which time the stabilizing planes 9 to 12 inclusive will function and will take part of the load off of the other planes. In case an accident should happen to the airship and the propellers stop, the arrangement of the power planes near the front and near the fuselage, and also the arrangement of two fuselages will result in a form of parachute which will have a tendency to automatically maintain its balance and gradually settle to the ground.

What I claim is:

1. In an airship of the character described, a propeller, a plurality of superposed planes in the rear of said propeller, a lifting plane in the rear of and above said superposed planes, said propeller being adapted to cause an air current to act on said planes for propelling and lifting the airship, and a deflector arranged beneath the lowermost of the superposed planes for directing a portion of said air current thereagainst.

2. An air plane of the character described comprising a plurality of spaced fuselages, a plurality of spaced planes connecting said fuselages, a set of propellers arranged in front of each set of said planes, whereby the air blast from the respective propellers will be caused to act on said planes for lifting purposes and the thrust of the propeller will be utilized in moving the plane forward through the air, a plurality of lifting and stabilizing planes extending laterally beyond each of said fuselages, and means for steering the air plane.

3. An airship comprising a plurality of spaced vertical walls, a plurality of forwardly positioned planes arranged between said walls, a plurality of planes positioned between said walls near the rear, a cabin or cabins connected with the walls, a plurality of propellers arranged adjacent the front of each of said planes, means for independently rotating said propellers, steering and lifting means arranged at the rear of each of said walls, and stabilizing planes extending laterally from each of said walls.

4. An airship of the character described comprising a plurality of lifting planes arranged in banks or batteries, a bank of propellers arranged in front of each bank of lifting planes, elevating and steering means, a plurality of stabilizing planes, and a brake acting in the double capacity of a brake and deflecting means for the air current from the propelling means so as to cause said air current to act as a lifting current at one time and a propelling power at another time.

5. In an airship of the character described, a plurality of lifting and sustaining planes, a fuselage connected with said planes, steering and elevating means connected with the fuselage, a plurality of series of independently operated propellers and walls in front of said propellers whereby any series of propellers may be operated at any desired speed for producing the same or different thrusts as preferred.

6. An airship of the character described comprising lifting and sustaining means, a fuselage connected with said means, steering and elevating means, propelling means, said propelling means comprising a plurality of series of propellers, walls in front of said propellers, and an independent power member for rotating each series of propellers whereby various thrusts may be secured from the various series of propellers without producing a retarding effect.

7. An airship of the character described comprising a fuselage, a plurality of planes, steering and elevating means connected with the fuselage, a plurality of independent propellers, and means comprising a wall positioned in front of said propellers and an annular surrounding deflector adjacent each propeller whereby the respective propellers may be operated at different speeds and the maximum individual thrusts of the respective propellers fully utilized irrespective of the speeds of the other propellers.

8. In an airship, a propeller positioned between a pair of walls lying in planes normal to its axis of rotation, and an annular deflector surrounding said propeller whereby the rotation of the propeller is effective to cause a current of air to pass inwardly between said deflector and one of said walls, and outwardly between said deflector and the other of said walls.

9. In an airship, the combination of a propeller, a wall disposed in a plane normal to the axis of rotation of said propeller and adjacent said propeller, and an annular deflector surrounding said propeller and spaced from said wall.

10. In an airship, the combination of a propeller, a wall positioned adjacent to and normal to the axis of rotation of said propeller, an annular deflector surrounding said propeller and spaced from said wall, and a plane adjacent said propeller and adapted to receive air currents generated by the rotation of said propeller.

CHARLES H. CASPAR.